(12) United States Patent
Hach et al.

(10) Patent No.: US 11,784,594 B2
(45) Date of Patent: Oct. 10, 2023

(54) DURABLE DIESEL GENERATOR SYSTEM

(71) Applicant: Northern Lights, Inc, Seattle, WA (US)

(72) Inventors: Tracy Hach, Shoreline, WA (US); Donald A. Williams, The Woodlands, TX (US); Kristopher Purdy, Seattle, WA (US); Alexander Zachary Brooks, Seattle, WA (US); Phillip Reingold, Mukilteo, WA (US)

(73) Assignee: NORTHERN LIGHTS, INC., Seattle, WA (US)

( * ) Notice: Subject to any disclaimer, the term of this patent is extended or adjusted under 35 U.S.C. 154(b) by 0 days.

(21) Appl. No.: 17/177,692

(22) Filed: Feb. 17, 2021

(65) Prior Publication Data
US 2021/0257944 A1 Aug. 19, 2021

Related U.S. Application Data

(60) Provisional application No. 62/977,560, filed on Feb. 17, 2020.

(51) Int. Cl.
*H02P 9/02* (2006.01)
*H02K 7/18* (2006.01)
*F02N 11/08* (2006.01)
*H02K 11/33* (2016.01)
*H02M 7/44* (2006.01)

(52) U.S. Cl.
CPC ............ *H02P 9/02* (2013.01); *F02N 11/0862* (2013.01); *H02K 7/1815* (2013.01); *H02K 7/1823* (2013.01); *H02K 11/33* (2016.01); *H02M 7/44* (2013.01)

(58) Field of Classification Search
CPC ........ H02P 9/02; H02K 11/33; H02K 7/1815; H02K 7/1823; F02N 11/0862; H02M 7/44
See application file for complete search history.

(56) References Cited

U.S. PATENT DOCUMENTS

| | | | |
|---|---|---|---|
| 2015/0217761 A1* | 8/2015 | Christman | F02N 11/0862 701/22 |
| 2017/0070049 A1* | 3/2017 | Laubenstein | H02M 7/06 |
| 2018/0050686 A1* | 2/2018 | Atluri | B60W 20/40 |

* cited by examiner

*Primary Examiner* — Sean Gugger
(74) *Attorney, Agent, or Firm* — BRAINSPARK ASSOCIATES, LLC

(57) ABSTRACT

Disclosed are improved devices, systems and methods for powered generator systems which incorporate a solid-state transient power response system to provide supplemental electrical power to the power output during a transient period of increased electrical load, which permits the generator system sufficient time to progressively "spin up" the generator and/or otherwise increase power output at a desired rate to meet the increased electrical load demand in a desired manner.

19 Claims, 6 Drawing Sheets

DURABLE DIESEL GENERATOR SYSTEM

CROSS-REFERENCE TO RELATED APPLICATIONS

This application claims the benefit of U.S. Provisional Patent Application Ser. No. 62/977,560 entitled "DURABLE DIESEL GENERATOR SYSTEM" filed Feb. 17, 2020, the disclosure of which is incorporated by reference herein in its entirety.

FIELD OF THE INVENTION

The present subject matter relates generally to devices for generating an electrical power output. In particular, the present subject matter relates to a diesel powered generator system (or virtually any internal combustion engine) which incorporates a solid state transient power response system to provide supplemental electrical power to the power output during a transient period of increased electrical load, which permits the generator sufficient time to progressively "spin up" and increase its power output to meet the increased electrical load demand.

BACKGROUND OF THE INVENTION

Electrical power is the basis of our modern civilization. Our lifestyle and economic growth are intimately tied to electrical energy, and the world's appetite for electrical energy keeps growing. While much of civilization's daily electrical energy needs can be met by large, industrial scale electrical generation and distribution facilities (i.e., the electrical "Grid") sourcing power from renewable sources and/or fossil fuels, there remains a significant portion of our electrical energy needs that cannot yet be adequately addressed solely by the electrical Grid. For example, large mobile electrically powered devices, remotely located facilities, systems that require isolation from power supply lines and/or many vehicles (trucks, boats, planes, military vehicles, etc.) often cannot be safely "tethered" to the electrical Grid, especially when the electrical needs of these systems cannot be adequately supplied by on-site battery storage devices.

Internal combustion engine (ICE) powered generation systems such as diesel generator systems are commonly utilized as sources of electrical energy for mobile applications, for emergency power systems and/or to provide electrical power in remote locations, and these systems basically consist of a diesel engine (i.e., a prime mover) connected to an electrical generator (often called an alternator). Depending upon the specific application there may be many additional components for a given diesel generator system, but in most cases a diesel generator will also have a fuel system, a voltage regulator, a cooling and exhaust system, a lubrication system, a battery charging system and a control panel.

While ICE generator systems can be highly efficient in producing "steady state" electrical power, a constantly changing electrical load on an ICE generator system can be especially challenging on the system. Whenever a large load is added to an ICE generator set (i.e., "block loading"), the increased load typically causes the ICE speed to temporarily slow down (i.e. the speed "dips") for a period of time before the engine control systems are able to return the engine to a steady-state condition. When a large load is removed, engine speed increases—or overshoots—temporarily. A measurement of these temporary impacts to the quality of electrical power changes is called "transient response," and the amount of time it takes for the engine to return to a steady-state operation (typically at the new loading level) is called "recovery time." In many applications, recovery time can vary from as little as 1 second to 20 seconds or more, with a longer engine recovery time for greater load changes to the bus.

In general, the mechanical limitations of a typical ICE generator and its control systems cannot respond quickly enough to a significant power spike or "swell" (i.e., a voltage and/or current surge) or power brownout or "sag" (i.e., a voltage and/or current deficiency) to avoid damage to attached electrical equipment, so attached equipment and/or the power generation system itself will often seek to uncouple from electrical loading during such times of power anomalies. Large dips are typically more critical than overshoots because a large enough load increase (i.e., a large increase in block loading which causes a significantly increased current draw on the generator set) can result in a severely decreased voltage of the output power signal. In some cases, acute block loading can stall the diesel engine and/or cause the generator voltage to collapse. While similar concerns exist for large load reductions to an ICE generator set (which can cause acceleration or "overshoot" of the ICE engine speed), dips are generally more critical than overshoots, as the ICE engine and/or transmission rotating mass and/or inertia will often compensate better in overshoot situations.

In many cases, especially where large transient load changes are expected and/or anticipated, a user will select an "oversize" ICE generator for a given application, which can result in major wasted cost for the initial purchase of the ICE generator set, higher operating costs, inadequate facility space and/or wrong conductor sizing, etc. Moreover, an oversized ICE generator set which operates at loads significantly below its rated capacity may eventually malfunction due to inefficient fuel combustion in the engine, especially where the ICE is operated at less than 30% of its standby rating, which can result in plugged injectors, wet stacking and/or other damage (especially in diesel engines).

Where uncoupling of loads is impossible or undesirable for a variety of reasons, a power generating system might optionally incorporate a backup power supply system to "make up the difference" during periods of power anomalies, such as a secondary uninterruptable power supply (UPS) system that incorporates batteries and/or supercapacitors. While such systems can be quite effective in accommodating transient power sags, these secondary systems are often expensive, heavy, require extra storage space to accommodate batteries or other energy storage devices, and often require periodic maintenance and testing of system components.

In many cases, significant power load changes, either requiring additional power or less power, may cause the engine and/or other system components to deviate from their desired operating range, which may result in poor efficiency, less production, increased wear on the engine, and operator dissatisfaction. For many reasons, therefore, there is significant need for further improvement in power generation systems of this type, and the present subject matter is such improvement.

BRIEF SUMMARY OF THE INVENTION

The following presents a simplified summary of the subject matter in order to provide a basic understanding of some aspects of the subject matter. This summary is not an extensive overview of the subject matter. It is intended to neither identify key or critical elements of the subject matter nor delineate the scope of the subject matter. Its sole purpose is to present some concepts of the subject matter in a simplified form as a prelude to the more detailed description that is presented later.

In accordance with an aspect of the present subject matter, an electrical generator system is described which includes a prime mover or motor such as a combustion engine or diesel motor, and an electrical generator or alternator. Desirably, the system further includes one or more pre-existing energy storage devices such as "starting batteries," which are currently utilized primarily to provide an initial "starting impulse" to actuate the motor and secondarily to provide limited power to various electrical and/or other components of the system. The system also desirably includes a power regulation system which includes a quick response load adjustment regulation circuit capable of transferring stored electrical power from the starting batteries to the power inverter circuit during periods of increased block loading of the system.

In various embodiments, the quick response load adjustment regulation circuit can desirably include solid state electronic components capable of "stepping-up" a 12 volt (or other battery voltage) DC signal from the starting batteries to a 400 volt DC starting battery signal, wherein this 400 V DC starting battery signal can then be combined with a 400 volt DC output coming from the Diesel generator for combined input into an AC inverter, which in turn provides AC power to various system loads. When a significant block electrical load is added to the system, the quick response load adjustment regulation circuit desirably accommodates the increased 400 volt DC current demand from the AC invertor by increasing the 12 volt DC draw from the starting batteries and stepping up this increased 12 volt DC draw to an increased 400 v DC starting battery signal, which desirably reduces and/or prevents increased loading of the diesel generator for a sufficient period of time to allow the diesel generator to gradually increase its output to meet the new loading requirements. Once the diesel generator has reached its new load level, the quick response load adjustment regulation circuit desirably reduces the 12 volt current draw and in some embodiments can optionally reverse 12 volt DC current flow back into the starting batteries to recharge the starting batteries in anticipation of the next block load change (i.e., especially in situations where a subsequent block load reduction may create an excess amount of available energy from the generator—which excess energy may be channeled by the quick response load adjustment regulation circuit back into the starting batteries in an effort to increase the battery charge state).

Desirably, the quick response load adjustment regulation circuit can comprise a relatively small and light component that can be easily accommodate on or near the diesel generator and/or starting battery compartment, which allows the system to be installed and utilized without long cable runs which can significantly deplete available electrical energy and/or the need for extensive system modifications. By utilizing the starting batteries to store energy for use during transient power changes, especially significant increased block loading of the diesel electrical generator system, the present invention reduces and/or obviates the need for the many expensive and/or bulky secondary systems that currently exist to accommodate transient load changes, as well as obviates the need for oversizing of the power generation system.

In various alternative embodiments, the present invention can include methods for utilizing and/or operating the various electrical generator systems and/or individual components thereof as indicated above. This can include a method for manufacturing an electrical generator system and/or individual components thereof within any of the details described with the present application; a power regulation system which includes a quick response load adjustment regulation circuit as set forth within any of the details described with the present application; and/or a quick response load adjustment regulation circuit as set forth within any of the details described with the present application.

While embodiments and applications of the present subject matter have been shown and described, it would be apparent to those skilled in the art that many more modifications are possible without departing from the inventive concepts herein. The subject matter, therefore, is not to be restricted except in the spirit of the appended claims.

The following description and the annexed drawings set forth in detail certain illustrative aspects of the subject matter. These aspects are indicative, however, of but a few of the various ways in which the principles of the subject matter may be employed and the present subject matter is intended to include all such aspects and their equivalents. Other objects, advantages and novel features of the subject matter will become apparent from the following detailed description of the subject matter when considered in conjunction with the drawings.

BRIEF DESCRIPTION OF THE SEVERAL VIEWS OF THE DRAWINGS

The foregoing and other objects and advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
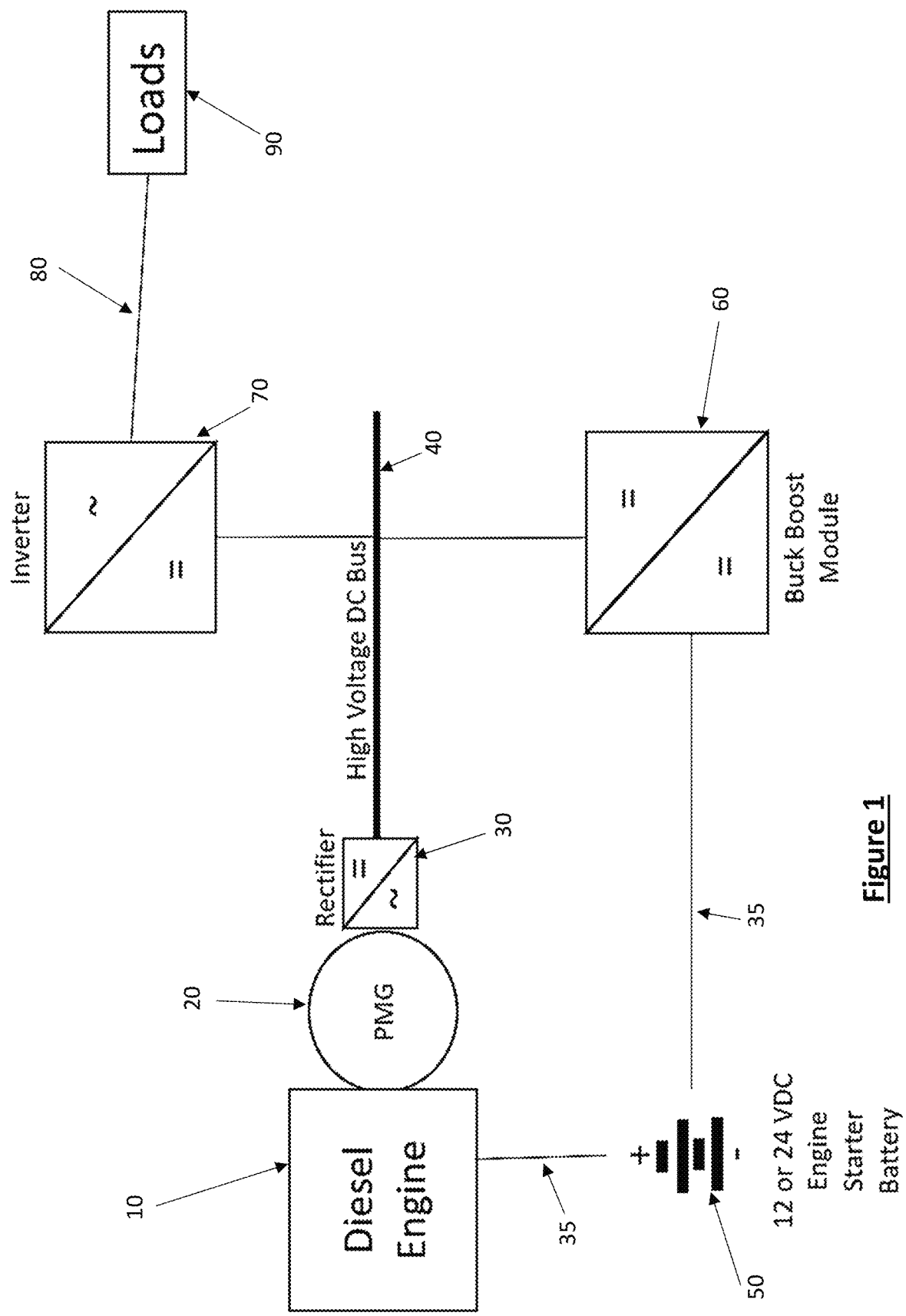
FIG. 1 depicts a schematic drawing of one exemplary embodiment of a power generation and regulation system which includes a quick response load adjustment regulation circuit.

To provide an overall understanding of the systems, devices, and methods described herein, certain illustrative embodiments will be described. Although the embodiments and features described herein are specifically described for use in connection with generator driven power delivery systems, it will be understood that the systems, devices, and methods described herein can be adapted and modified for any suitable power delivery application and that such other additions and modifications will not depart from the scope hereof.

The present subject matter relates generally to electrical generator systems and/or components thereof, and specifically relates to devices, systems and/or methods for accommodating large transient load changes that are applied to a diesel, gasoline, propane natural-gas or other ICE powered electrical generating system. In various embodiments, the electrical generating system can include a power regulation system which incorporates a quick response load adjustment regulation circuit that utilizes DC power drawn from the engine's starting batteries to accommodate significant increased power demands on the electrical generator system for a limited period of time sufficient to allow the ICE powered engine to "throttle up," "spin up" and/or or otherwise accommodate the increased load in a gradual and/or non-instantaneous fashion. Once the power output of the engine can accommodate the new loading, the power regulation system and/or quick response load adjustment regulation circuit can reduce, halt and/or reverse the DC power drawn from the engine's starting batteries, as desired.

In various embodiments, the disclosed power regulation system and/or quick response load adjustment regulation circuit may include features that enable the system to reduce and/or mitigate the increased mechanical loading of the ICE below a predetermined level in response to a large transient load change. For example, if a diesel-powered electrical generating system can accommodate up to a 30% electrical step load increase before safety features in the system "trip" off-line for some reason (i.e., to protect the generator from mechanical damage resulting from a greater than acceptable load increase or to prevent the generator from stalling), the quick response load adjustment regulation circuit can desirably "load-share" the increased block loading to prevent activation of the safety feature. For example, where a block load is applied that increases the total loading of the diesel-powered electrical generating system by 40%, the power regulation system and/or quick response load adjustment regulation circuit may elect to increase the DC power draw from the engine's starting batteries to accommodate only half of the block loading increase (i.e., 50% of the total block load increase, or half of the 40% increased power requirement), and allow the remaining half of the increased power requirement (i.e., the remaining 20% block loading increase) to be "absorbed" and/or accommodated by the diesel engine and/or remaining system components. In this way, the system can electronically regulate mechanical changes in the engine loading to accommodate various system safety features.

In a similar manner, the various features of the disclosed system have the capability to provide power (and/or power quality) in excess of the maximum capacity of a given diesel or gas-powered electrical generating system for limited periods of time, such as during start-up of large motors and/or compressors. In some cases, motors can draw a high inrush current during starting of up to six times full load current, with high-efficiency motors potentially doubling that amount. In other instances, motors with high inertial loads can require up to three times rated power during starting. Moreover, the employment of variable frequency drive motors (and their attendant frequency harmonics), the number, type and location of high-efficiency motors, and the potential for simultaneous and/or sequential starting of motors can exceed the maximum capacity of a given electrical generating system. Desirably, when the electrical loading requirements potentially exceed the electrical generating system's maximum output capacity, the power regulation system and/or quick response load adjustment regulation circuit can provide an increased DC power draw from the engine's starting batteries to accommodate this required excess, which is provided in combination with the maximum output from the diesel engine and/or remaining system components.

In another exemplary embodiment, the power regulation system and/or quick response load adjustment regulation circuit can provide emergency and/or supplemental power to various system loads without input from the diesel or gas-powered motor, such as where the urgency and/or timeliness of the electrical demand is critical (i.e., where the electrical need cannot wait for the combustion motor generator to be started and reach operating status), or where the ICE motor may be non-operational and/or suboptimal for some reason. In such a case, the starting batteries can be utilized to provide the emergency load. If desired and such capacity exists, additional energy storage and/or generation devices such as "house batteries" or wind/solar generating capacity may be cross-connected to inputs for the quick response load adjustment regulation circuit.

Although the description provided is specific to the current generator unit designed to supply a 10 kW load, this invention can be adapted to generators of smaller and/or larger sizes and configurations, as well as generators that utilize different starter battery power sources such as 24 volt starter battery sources and/or lower/higher voltage and/or current load requirements. Applications may also vary from marine auxiliary power to marine propulsion, stationary power, vehicular Auxiliary Power Units, vehicular drives, emergency equipment and/or equipment loads, etc. In particular, the various devices and/or components described herein may be applicable to any application that may require an electrical power boost (or boosted output from an electrical generating device) in order to allow the power supply engine to recover from a sudden block load change.

While the various system components are described above as controlling power flow from the battery to a DC output for eventual conversion to AC power, in some embodiments the power controlling components may contain power conversion circuitry that is configured to control power flow both from the battery to the DC/AC bus, as well as from the DC/AC bus to the battery system. In this way, the power controlling components can control power flow in the case of certain events occurring at the DC/AC bus, such as a regeneration event, a connection/disconnection in the system, a power surge, a power spike, or any other power event occurring at the DC/AC bus. The power controlling components may provide charge to the battery when there is excess power on the DC/AC bus. The power controlling components may prevent/regulate charge from flowing to the battery from the DC/AC bus if that charge would overload the battery or other energy storage system, if the battery is already fully charged, if the battery is operating at too high of a temperature, or the components may prevent/regulate charge flowing to the battery or other energy storage system for any other suitable reason. The same power controlling components may controlling power in a bidirectional manner, or separate components may be utilized in conjunction to control power in a single direction.

Figure 2:
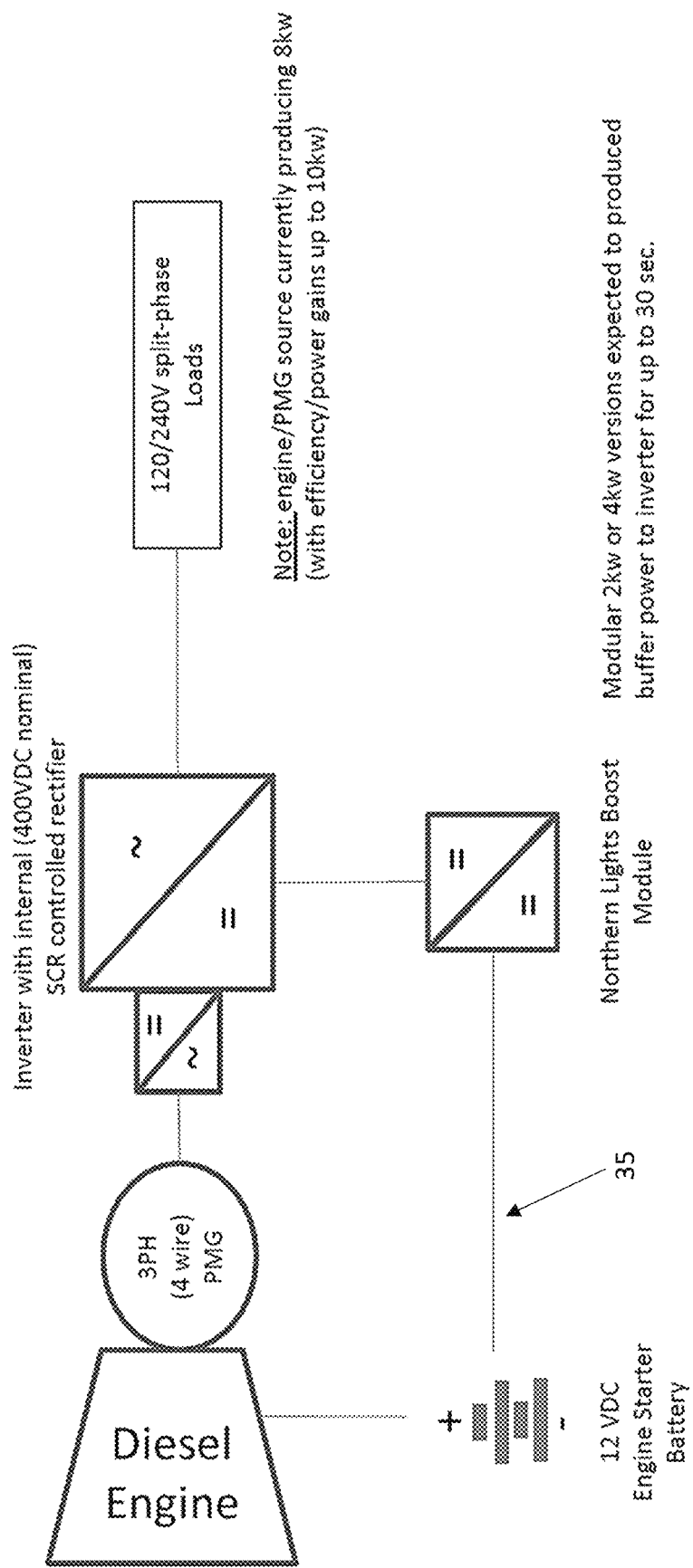
FIG. 2 depicts a schematic drawing of an alternative embodiment of a power generation and regulation system which includes a quick response load adjustment regulation circuit.
Figure 3A:
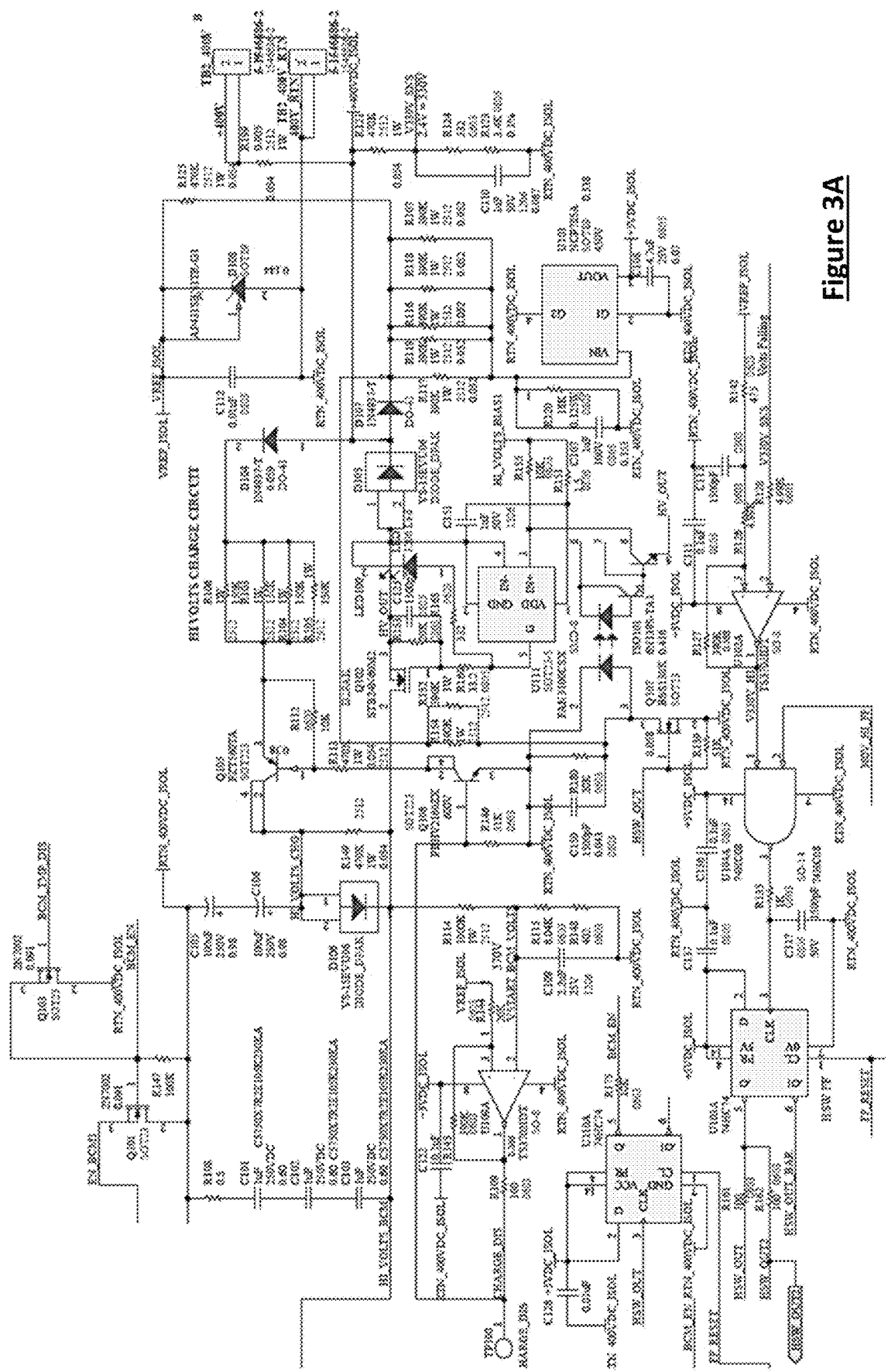
FIGS. 3A through 3D depict a circuit diagram of an exemplary quick response load adjustment regulation circuit.
Figure 3B:
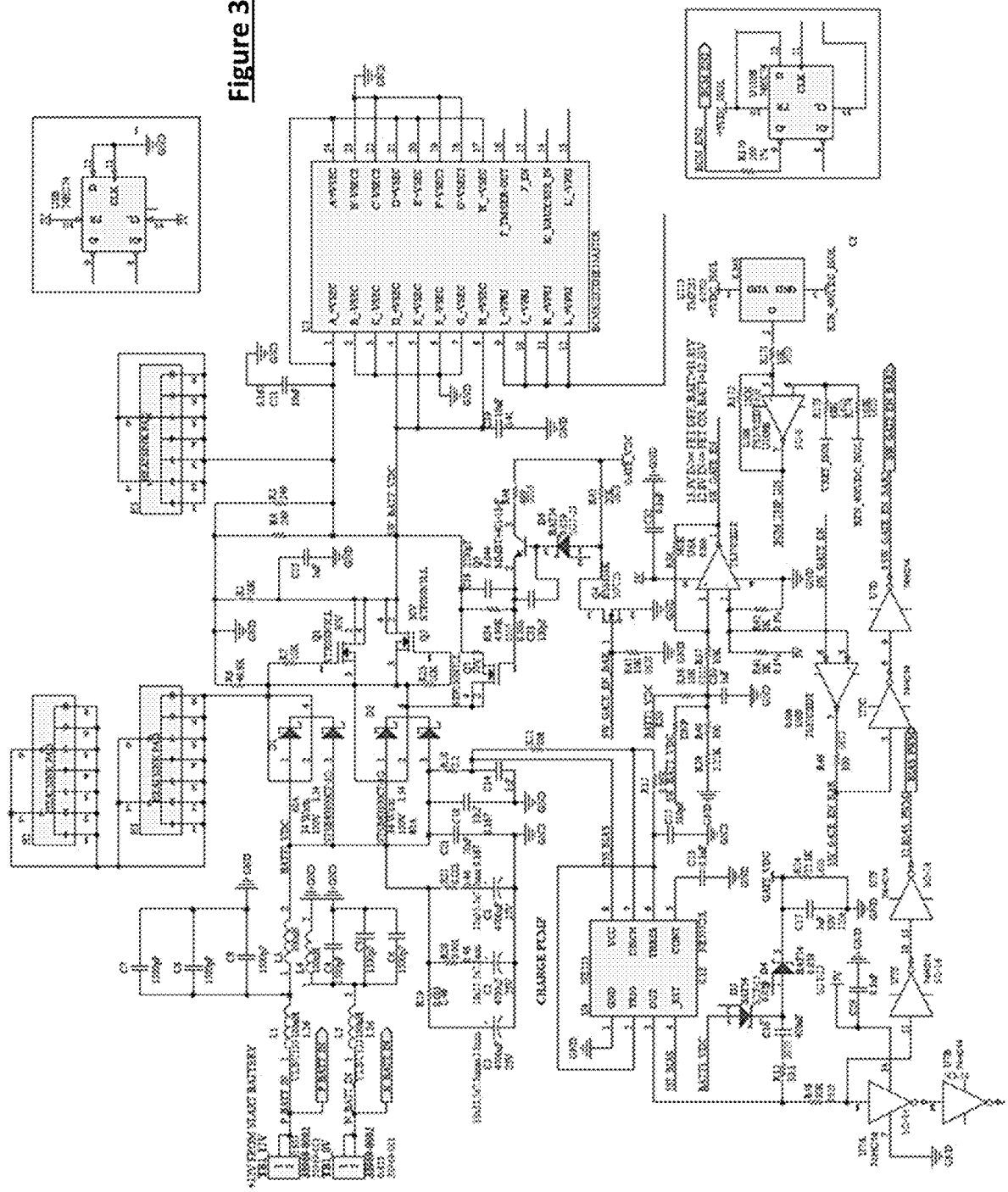
Figure 3C:
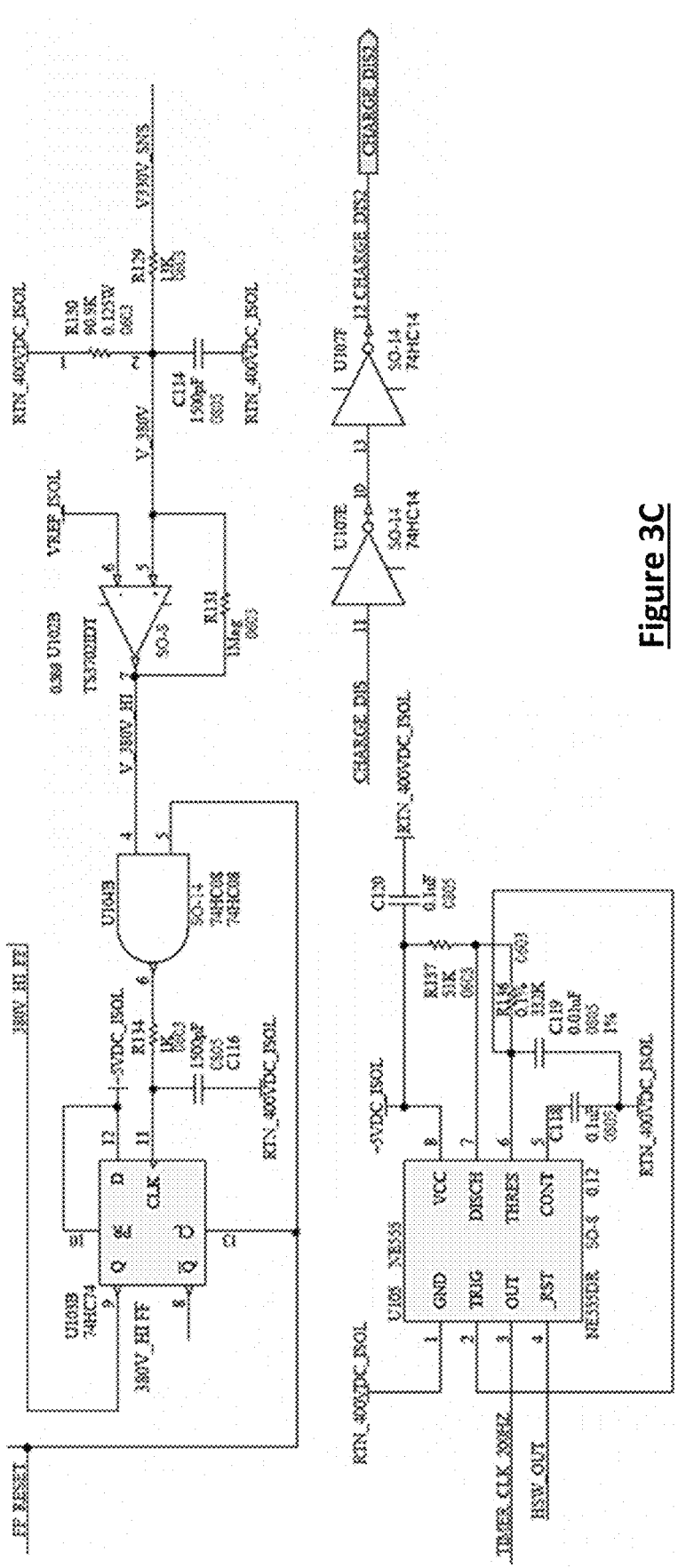
Figure 3D:
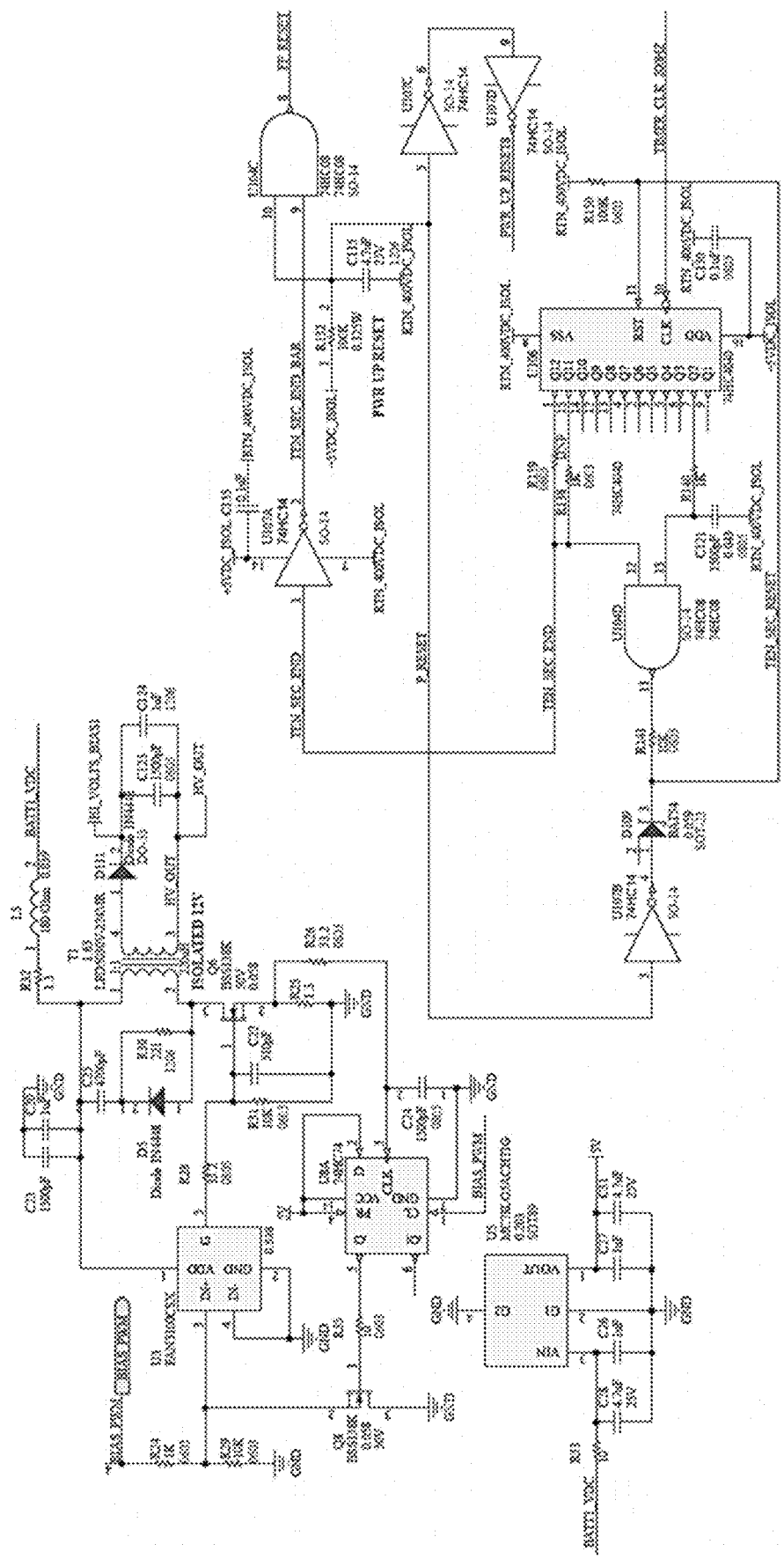

FIG. 1 depicts a schematic view of one exemplary embodiment of a power generation and regulation system which includes a quick response load adjustment regulation circuit. In this embodiment, power is mechanically generated using a diesel engine 10, the output shaft of which is mechanically linked to an input shaft of a permanent magnet generator (PMG) 20. The PMG creates a DC voltage from the mechanical power input in a known manner using a rectifier 30, with a DC output sent to a high voltage DC bus 40. The diesel engine typically includes a starting battery 50, which provides current flow via a low voltage DC bus 35 to actuate a starter motor which "turns over" and starts the diesel motor in a well-known manner. In this embodiment, the starter battery is also connected (optionally in parallel and/or series) via the low voltage dc bus 35 with a buck boost module 60 (BBM), which desirably provides a boosted DV voltage from the starter batter to the high voltage DC bus 40. The high voltage DC bus in connected to input of a DC/AC inverter 70, which converts DC power into AC power and feeds this AC power to an AC bus 80 which provides power for various loads 90. FIG. 2 depicts a schematic view of an alternative embodiment of a power generation and regulation system which includes a quick response load adjustment regulation circuit.

Exemplary Embodiment—Design Operational Theory

In one exemplary embodiment, the disclosed system components can provide a "step up" of the Generator Starting Battery Voltage from a nominal 13.8 V (the typical level with a Battery Charger Active) at no load (i.e. the open circuit voltage), which can dip under high loads down into a range of 12.4 V-12.8 V (i.e., the loaded voltage of the battery) as the battery provides current (and typically the charger does not provide charging while the high current load of the BBM is actuated).

In general, one preferred embodiment of a BBM as disclosed herein will desirably provide a transient power "surge" to the high voltage DC bus of from 1.5 KW to 3 KW DC. Under optimal conditions, the BBM can provide transient power "surge" of up to 4 KW (such as where a pair of battery control modules can be activated) to the Solid State Inverter in the event of a transient power loss and/or significant load increase. In some embodiments, the "loss of power" can be assumed to be due to a step increase in generator load due to a large load demand increase, such as turning on a freezer or air conditioner. Upon sensing the significant load increase, the generator will desirably begin to respond to the step change in load, but the generator response may not be fast enough to reduce and/or obviate a dip in inverter output voltage to the user.

Inverter Dc Link

In this embodiment, the circuit components will receive power inputs from the Battery Side Charger/Battery (i.e., starting battery output voltage) and the Inverter Side from the Inverter DC Link Voltage (i.e., the inverter DC Link is supplied from the Generator 3 Phase Output power). The Inverter DC Link voltage can typically range from 390 V to 410 V DC, based on empirical measurement when the electrical load is minimal up to 1 W or 2 KW of loading as measured during testing. The DC Link voltage bus voltage can typically vary within that voltage range by a few volts during operation, generally due to a sinusoidal input variation and diode rectification of the 3 Phase voltage that creates the DC link. If desired, the diode rectification voltage can optionally be more narrowly controlled within the Inverter DC Link Circuit by using Silicon-Controlled Rectifiers (SCR's) instead of a straight 3-Phase Diode Bridge.

The BCM

The BBM can desirably incorporate a Boost DC to DC Transformer (also called a Boost Control Module or BCM—commercially available from VICOR corporation of Andover, Mass., USA), which can act as a step up or step down DC transformer similar to an ac transformer step up or step down of an AC voltage. The step-up ratio for a preferred BCM can be 32:1. The BCM Integrated Circuitry desirably "chooses" its direction of step up or step down by sensing the voltage on each side of the BCM power inputs. The primary side can be considered to be the high voltage side of the BCM, that varies from 390 V to 410 V DC based on the Inverter DC Link Voltage. The secondary side voltage of the BCM can be the Starting Battery Source Voltage, which typically varies from 12.4 V to 13.8 V DC. The BCM IC can be "set up" in its initial design to step-down a 400 V DC source to 12 V DC, assuming there is no 12 V source. Since this circuitry can reverse the "step down" direction at will, the BCM IC can also boost the battery voltage up to the Inverter DC Link Voltage as well (as it senses the input battery voltage and the primary output voltage). In various embodiments, the disclosed system components can "force" the desired direction of current and voltage flow within the BCM IC using the secondary side voltage present at the secondary side pins of the BCM, after a diode drop of 1.05 to 1.1 V which occurs due to 2 series diodes within the boost circuit.

The Series Diodes

As depicted in the circuit diagrams of FIGS. 3A through 3D, in one exemplary embodiment of a quick response load adjustment regulation circuit, the employment of 2 series diodes can be based on a primary desire for a maximum input voltage of 12.8 V from the secondary side of the BCM. Typically, the BCM will initiate an over voltage shutdown which disables the BCM if it senses a voltage of 12.9 V or greater at this location (according to the published BCM data sheet). While this feature does not appear to be adjustable at the current time (according to VICOR), it is contemplated that other voltage limits and/or ranges could be utilized in similar manners by the disclosed systems. Because the voltage present from the battery (with charger) is typically around 13.8 V DC, however, and this voltage would typically immediately shut down the BCM and cause the circuit to not function, the boost circuit design includes 2 diode drops in the design that are present in the form of diodes D1 and D2 (that are in parallel for a single BCM) and an additional 2 diodes in parallel when a second BCM may used. The additional Diodes are disclosed as D201 and D202 on the circuit diagram of FIGS. 3A through 3D. By providing these diodes in parallel, they can combine to provide a high current capability, but still provide a single series diode drop for all of the relevant diodes. In the disclosed embodiment these can be Schottky diodes (i.e., Schottky barrier diodes or hot-carrier diodes) and not standard silicon diodes, and can be rated at 100 V when reversed biased or when the voltage applied to the diodes is opposite that for diode conduction. The voltage drop for these diodes can vary from 0.35 V (no load) to 0.66 V (at high temperature at full load) according to various data sheets when conducting. D1 and D2 can be connected to Q1 and Q2, which are used herein not for their primary transistor functions, but rather for their internal diodes which are present within the transistors. The diode drop is 0.7 V minimum to 0.75 V per the data sheet. The combined series diode drop is at 1.05 V to 1.1 V minimum at no load. Given an input voltage of 13.8 V, this can restrict the BCM pin voltage from 12.75 V to 12.7 V, which is within the operational range of the BCM. There can also be a transistor Q3 placed in parallel with Q1 and Q2, wherein the purpose of Q3 can be that when the BCM is active, the current demand will dictate the Battery as the primary source as the Battery Charger is current/power limited. This means that the input voltage will now be 12.8 V to 12 V, and not 13.8 V. Moreover, the diode drops for D1, D2, Q1, Q2 will increase with increased load current of 120 A maximum. When the voltage at the input drops to 12.8 V or less, Q3 is placed in parallel with Q1 and Q2. Q3 is desirably an active transistor with a nominal resistance of 0.002 Ohms. An IR drop due to 0.002 ohms drops this voltage down to 0.24 V instead of 0.75 V to 0.9 V under load for Q1, Q2, which reduces the power losses to the drop in D1, D2 and Q3 when full load current is active on the secondary side of the BCM due to the 1.5 KW to 2 KW demand from the Inverter load.

The Battery Voltage Sense, Charge Pump and Q3

A battery input voltage can be sensed by comparator U6A, and triggers high (5 V) when the voltage threshold is reached of 13.8 V that shuts off Q3. When the voltage drops to 12.8 V, the comparator triggers low (0 V) and turns on Q3. Transistor Q3 is turned on or off by Transistors Q4, Q5 applying a voltage Gate Voltage to the transistor gate pin 1. When the gate voltage exceeds 8 V bigger than the voltage at the source pin of the transistor, this will turn on the transistor as a switch with low resistance path between the source pin 3 and the drain pin 2. Since the source and drain pins are at the battery voltage minus the diode drops, the gate voltage will be a minimum of 21 V, assuming a source pin voltage of 12.8 V. The charge pump circuit formed with IC U4 will act as a clock oscillator, which can be used to create a voltage doubling function, which can increase the input battery voltage by a factor of 2. A Spice simulation (Simulation Program with Integrated Circuit Emphasis—SPICE) of this circuit indicates a voltage of at least 22 V on the output, which should be sufficient to turn on Transistor Q3. The output label of this voltage is GATE_VDC and is present at the output of Diode D4. In order to use the comparator U6 and digital logic IC's U7 and U8, a 5 V-logic supply can be generated by using a U5 linear regulator to step down the voltage from the battery to 5 V and supply these Integrated Circuits.

High Voltage Switch Q102 Isolated 12 V

In the disclosed embodiment, integrated circuit can U4 can also be used to supply an isolated 12 V to the High Voltage Transistor Switch present on the primary 400 V output Q102, which isolated 12 V can be referenced to the output voltage from the BCM to supply the inverter. In order to turn on Q102, the gate voltage to the transistor will desirably be in excess of 8 V higher than the voltage at the source pin3 of the Q102. The isolated 12 V can be referenced to the source pin3 voltage of Q102. Using this isolated 12 V fills a desire to have a voltage that is referenced to the source pin of Q102. If the source pin is at 400 V, then the gate voltage can be 412 V when the Q102 is active as a transistor switch with a low on resistance. The absolute value of Q102 source pin is not absolutely critical to the turning on of the switch, but rather the gate voltage is desirably at least 8 V higher than the source pin of Q102. U4 desirably provides a pwm (pulse width modulated) frequency waveform at slightly less than 50% which is used to couple the battery voltage to the gate of Q102 by using transformer T1 to isolate and switch the Battery voltage to the Transistor Q102 using a "forward converter" switcher scheme made up of U3, Transistor Q6, Transformer T1, U8, and Transistor Q8. The Battery Voltage can be used to drive this gate voltage, as this voltage is generally present and easier to supply the Q102 gate driver voltage than using the 400 V from the Inverter. The BCM can be isolated on its primary side from the secondary side in a manner similar to an isolation transformer, so it may optionally be necessary to isolate and float this gate voltage so that it can be referenced to the source pin of Q102 regardless of that voltage value.

The BCM Control Primary Side Circuit

One primary function of the primary side control circuit can be to provide a function that "forces" the BCM to step up the 12.7 V (no load prior to activation) to a voltage 32× greater at 406.4 V, when the Inverter Link Voltage dips below 330 V, typically indicating a transient load increase event when a step load increase occurs at the output of the Inverter used to supply the ac load.

Isolated 5 VDC, Inverter Link Negative Return Referenced

To supply a desired power level to the operational amplifiers within the circuit (Op amps), transistors and digital logic on the inverter link voltage primary side of the BCM, a low current 5 V regulator U101 can be employed that uses the 400 VDC power source of the inverter DC link to supply the isolated 5 V. In one example, series power resistors R116-R119 and R107 can be chosen to minimize power losses on the regulator, as these circuit elements are relatively inexpensive and simple to implement. The combination of low current combined with series resistors used to implement the 5 VDC output logic supply that is isolated from Battery Secondary Volts allows for logic referenced to the Inverter DC link Negative 0 V reference voltage. The label for this 0 V isolated voltage node can be RTN_400 VDC_ISOL. All logic IC's, Opamps, transistors and comparators that are used on the primary side can be referenced to this 0 V node.

Turn on Sequence State Diagram

In the exemplary embodiment, the following sequence of events can be followed to initiate a BCM enable and turn on the BCM:

(1) BCM OFF, Start State, No States Latched.

(2) Inverter Link DC Voltage valid in place and that state is latched (i.e., state occurred and remembered) via U103B Flip Flop. This is implemented when the Inverter DC Link Voltage exceeds 380 V. As the nominal voltage from the inverter DC Link is 390 V to 410 V depending on load, the latching of this state represents normal operation of the Inverter. Voltage Sensing occurs via comparator U102B, AND gate U104B which latches the active High (5 V) state on the output of U103B.

(3) An Inverter Link DC Voltage "invalid" condition can occur when the dc link voltage falls below 330 V, indicating a dip in the dc link voltage. The circuit is implemented with the U102A comparator, the U104A AND gate and the U103A FlipFlop which latches this state, which in turn enables the BCM and at the same time turns on the output switch Q102 and starts the clock oscillator U105 that uses a 200 Hz clock to set up a 10 second to 20 second time period (lettable) during BCM operation.

(4) The 10 Second to 20 Second BCM Operation period can be followed by a BCM function disable and state reset to State 1. The Clock oscillator, U105 and Counter U106 can count up to either 10 Seconds or 20 Seconds, at which time U104D disables the counter and places it in reset.

(5) End of BCM ON Period.

Once the above steps have been completed, the counter output can shut itself down, and reset all previous states to a "start over" condition. This state would then place the circuit in state 1 again after this event, forcing the need for state 2 or a minimum of 380 V after the end of the event and the 10 second to 20 second period of operation. The net label TEN_SEC_RESET desirably disables the counter from U104D by bringing the reset pin to a reset state. Prior to that, the net label TEN_SEC_END will toggle U104C output to active low and place the net label FF_RESET in a reset state that affects U103A, U103B Flip Flops and resets them to OFF condition, effectively causing the circuit to assume state 1.

BCM High Voltage Charge Circuit

In the exemplary embodiment, the BCM Charge Circuit provides for the charging of the BCM primary side volts to 370 V, provided that the inverter dc link voltage is valid. The purpose of this circuit is to provide a BCM primary voltage that is within the operational voltage range, but insufficient as to cause normal operation—rather causing reverse operation of the BCM once enabled per State 3 above. Desirably, the BCM will "look" at the 12.8 V or 12.7 V and, based on the primary voltage in at 370 V, "decide" that the voltage from the secondary should be 370 V/32=11.56 V and that 12.8 V×32=409.6 V indicates that the secondary volts needs to be the input source voltage and the 409.6 V needs to be the output of the BCM primary to the Inverter DC Link. Since the 370 V will be can be eventually discharged due to resistive paths, the comparator U109A desirably constantly charges the BCM high voltage link to maintain the 370 V until the Inverter Link DC Volts drops below 330 V, per State 3. In various embodiment there can be a hysteresis volts incorporated into the comparator that can be used to maintain the BCM High Voltage input every time the voltage falls below the hysteresis absolute threshold of 10 V to 20 V below the 370 V threshold to turn on the charge circuit. The charge circuit can include U110A, Q106, Q105, C106, C105, R104-R106, D104, R112 and R113. Desirably, this circuit will shuts off at 370 V and then turns back on at 10-20 V below that level, if the voltage decays due to leakage until the BCM is enabled. The output switch can be turned on at the same time the BCM is enabled. When the BCM is enabled, Capacitors C105, C106 are desirably charged and available to the load as the BCM comes up transiently to drive the Inverter DC Link.

In the exemplary embodiment disclosed herein, a number of objectives can be achieved, including one or more of the following:

(1) the provision of from 2 kilo Watt to 4 kilo Watt of Selectable Standby Power in the event of a Power Dip on the Inverter DC Link during Engine-Generator Operation to supplement Inverter Power via the DC Link;

(2) the provision of Standby Power from the Engine Starting Battery or Battery Bank as a primary power source;

(3) the provision of power for a time period of from 10 to 30 seconds with End of Time Disable Function per Power Dip;

(4) the optional inclusion of Series input Diode(s) with Power Fet Transistor Switch to maintain Optimum Volts DC input from the Battery/Generator DC Source;

(5) the inclusion of a Battery Voltage Sense Comparator for Transistor Switch;

(6) the ability to manually select 1, 2 or more BCM's on an as-needed basis;

(7) the provision of a Forward/Reverse Startup Circuit to place the Circuit into Reverse Mode On Standby prior to Inverter DC link Power Dip;

(8) the inclusion of an Output 400 V FET Transfer Switch Used to Bridge to Inverter DC Link when a Power Dip Detection Occurs and Verifies that the DC Link came up initially when the Engine starts;

(9) the inclusion of an Output Comparator to sense when a Power Dip Occurs on the Inverter DC Link;

(10) an optional Output Series Diode for Power Flow to DC Link only;

(11) the provision of a Circuit Active LED Indicator;

(12) the provision of a Circuit Sleep Mode until Engine Comes Online and DC Link is Valid; and

(13) the provision of a DC Link Active Indicator.

In certain implementations, in response to determining that the power required by the system user(s) exceeds a threshold power level that can be readily supplied by the generating system, the processing circuitry may draw power from the starting battery to increase the power output of the system from a first generator power level to a second generator power level. It will be understood by those of skill in the art that, although the systems and methods described herein with respect to a single generator and a single battery or other energy storage system, any number of power sources and power source types may be combined and regulated using that various power controller(s) and associated system components, as described herein.

The various system components described herein can allow for the controlled regulation of current and power flow from the charging battery or other energy storage system to a DC bus for use in generating supplemental AC power. As discussed above, this added ability to control power flow allows for a more efficient system and minimized disruptions to the AC power supply, minimized generator wear, reduces the need for oversized generator components and allows for less fuel usage. Furthermore, the disclosed systems can allow for a graded power supply, introducing heightened levels of customization in how energy from the battery is used in the power delivery system. In some embodiments, a power controller component can be configured to receive inputs from, for example, an electric motor or other load, the generator and the battery of other energy storage system, and determine the output power from the battery to the DC bus in response to these inputs, allowing for further customization of the system which may contribute to overall system health and heightened efficiency. This ability may allow for longer battery lifespan, and may prevent energy storage system problems, for example, high temperatures and rapid changes between battery charging and discharging.

In some embodiments, one or more system components will incorporate power conversion circuitry, such as a DC-to-DC converter, a switch, a chopper circuit, a silicon controlled rectifier, a rectifier, a contactor, a diode, or any other suitable power regulation circuitry or combination thereof. These circuit elements may be configured to allow power to flow from the battery to a DC bus or other output. Furthermore, a power controller component may be configured such that the controller output may be in discrete levels, or in a continuous range of DC power outputs. According to some embodiments, the power controller can be a discrete element, however, it may be integrated into the generator, batter or other energy storage system, or other suitable element of the power delivery system or external elements thereof. While some embodiments may show a single power controlling component or group of components, as would be understood by one of ordinary skill in the art, other configurations may be contemplated. For example, there may be one or more controllers coupled between a battery and the DC bus, either in series or in parallel, and may involve the same or different power conversion circuitry. Further, as there may be multiple battery banks or other energy storage systems present in a given system design (i.e., separate "house" battery banks and starting battery banks), all or some of these energy storage systems may connect to a power controller, or some components may be directly connected to the DC bus by way of different components or power controllers.

The power controlling systems and devices described herein may comprise additional circuitry and elements in addition to power conversion circuitry, which may be bidirectional. FIGS. 3A through 3D depict an exemplary circuit diagram of an illustrative quick response load adjustment regulation circuit, which can include processing circuitry, communication interfaces, memory, user displays, storage, integrated circuitry, power control components and other circuitry and processing elements or combinations thereof. Various power conversion circuitry and components may be configured to receive the power controller inputs and outputs. A communication interface may be configured to receive communication inputs, and output communication output. Processing circuitry, power conversion circuitry, communication interfaces, memory and other components may all be coupled by way of connections.

The processing circuitry in various embodiments may comprise any suitable hardware capable of being configured to process, communicate, and control inputs and outputs of the various components described herein. For example, the processing circuitry may be one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i9 processor). In some embodiments, the processing circuitry may be configured to access memory and determine an appropriate stored algorithm or function based on the current inputs, and then use inputs from a communication interface, such as a battery system temperature, and stored data in the memory, such as recent history of battery system temperature, to determine new outputs, such as increasing a generator speed, and new power outputs, such as increasing a voltage output by various power conversion circuitry. As would be understood by one of ordinary skill in the art, other inputs and storage data from the memory may be used by the processing circuitry, and may be used in a variety of algorithms or functions. Furthermore, it should be understood by one of ordinary skill in the art that processing circuitry may be configured to use a variety of algorithms or functions to determine other outputs not previously described.

In various embodiments, memory may be configured to store data over time from the system components, processing circuitry and/or communication interfaces. For example, the system memory may store information about past and battery temperature and use, generator operation over time and/or past and current power output. Such memory may comprise dynamic random access-memory, static access memory, hard drives, floppy disks, magnetic storage devices, flash memory, or other suitable memory storage devices or combinations thereof. In some embodiments, memory data may be transmitted off-site for review and use by technicians and/or monitoring personnel. The memory may be configured to store algorithms or functions for use, and these algorithms or functions may be used to analyze some or all inputs, that is, power controlling component inputs and/or communication inputs, and stored data in the memory, and using said algorithms or functions and said inputs to compute new power control outputs and/or communication outputs.

In some embodiments, a power controller or other circuit element may allow for storage and receipt of various system inputs, and may allow for processing of these inputs to determine various system outputs. In some embodiments, the inputs may come from anywhere in the power delivery system and may be processed in algorithms or functions, which determine appropriate outputs. For example, the a power controlling component may be controlled by the processing circuitry, and the use of these algorithms may control when the starting battery delivers power to the AC power delivery system, such that the starting battery may be used on an as needed basis. As discussed above, this added customization may allow for a more efficient power delivery system.

In various embodiments, a communication interface may comprise any suitable hardware for receiving and transmitting signals using communication inputs from various elements of the power delivery system. For example, communication inputs may comprise generator data, such as voltage, frequency and operating point of the generator, energy storage system data, such as state of charge, state of health, and temperature of the starting batteries, power required by, for example, a propulsion system, a refrigerator or freezer, a traction motor or other output load, DC bus voltage, user inputs, power controller operating data, fuel type or level, or any other suitable input or combination thereof. Furthermore, the communication interface may be configured to output communication outputs to various elements of the power system and/or other external elements including user displays. These outputs may include generator controls, battery system controls, mechanical controls, user interface display controls, and instructions to power conversion circuitry, which may also be sent by way of wired or wireless connections.

In another exemplary embodiment, the power regulation systems and/or quick response load adjustment regulation circuits describe herein can provide emergency and/or supplemental power to various system loads, including during "start up" procedures involving large initial loads for motors and/or compressors (i.e., air conditioning and/or refrigeration) that may be connected to a variety of power sources of limited capacity. For example, a power outlet that supplies 15 amps of 110 volt AC power may be capable of operating an portable air conditioner, but the initial transient "start-up load" required to activate the compressor and fans within the air conditioning unit may be upwards of 20 or 30 amps, which can "trip" any circuit breaker attached to the power outlet. However, by employing the various system components described herein, the present invention can provide the additional 5 to 15 amps of transient loading (or even the initial 20 to 30 amps of total power) needed to activate the air conditioning unit, with the remaining power provided by the power outlet once the unit reaches a steady operating state. Moreover, any additional increased power "spikes" required by the unit beyond the capability of the power outlet can be periodically accommodated by the system components as described herein. It should be understood that the generator systems described herein may be replaced by other electric power supplies, such as a large-scale energy storage system, wall outlet, flywheel, fuel cell, battery, capacitor, or other suitable power supply or combinations thereof.

Unlike typical series-hybrid power delivery systems which can involve the direct connection of an energy storage system and/or a generator to the same DC bus, in the present configuration the system components desirably substantially insulate or "isolate" the starting battery from the DC bus under normal operating conditions, and thus the starting battery does not typically experience the frequent discharges that it might when directly attached to the DC power supply bus. A direct connection between the DC bus and the battery can also cause the battery to frequently and rapidly charge and discharge, resulting in high battery temperatures and breakdown of the internal battery components—significantly reducing battery life and ability to hold a charge. Thus, the prior art systems typically result in many inefficiencies, such as using fuel to unnecessarily charge a battery, energy loss due to resistance in the battery, damage to battery components, and many others.

In general, the invention and operational theory encompasses a circuit board or other system components that operate as a power buffer and/or power supply. In various embodiments, the system provides power from the generator starter battery for use in generator load management. In certain implementations, the processing circuitry in the system may detect operating level inputs from at least one of the generator, the AC bus, the DC bus, any power controllers, and the battery or other energy storage system(s) using processing circuitry, and determine the input, output and/or threshold power levels using the operating level inputs. The operating level inputs from the battery or other energy storage system may include at least one of a state of charge of the energy storage system, a state of health of the energy storage system, and/or a temperature of the energy storage system. In certain implementations, the operating level inputs from the generator may comprise at least one of a speed of the generator, a temperature of the generator, a voltage output of the generator and/or any relevant frequency of power generated by the generator.

It should be understood that the various components of an ICE electrical generating system described herein may be utilized as stand-alone devices for incorporation into many different electrical generating systems, including systems utilizing fossil fuel or other energy sources and/or renewable energy sources such as solar, wind, hydroelectric, geothermal, ocean, hydrogen and biomass energy. In various embodiments, the power regulation systems and/or quick response load adjustment regulation circuits disclosed herein may be utilized to provide supplemental energy to such electrical generating systems and/or increase the available power output of such system beyond their rated capacities for a limited period of time. According to at least one aspect, output power may be regulated and delivered by using the processing circuitry to detect how much power is supplied to an output bus by a generator, and in response to determining that the power required by the output bus is less than a threshold power level, wherein the processing circuitry may increase an output voltage of the power controller from a first voltage level to a second voltage level in accordance with the various teachings herein.

The generators and system components described herein can include any suitable devices for converting mechanical power into electrical energy, including, but not limited to, a homopolar generator, a magnetohydrodynamic generator, an induction generator, or any other suitable generator or combinations thereof. In some embodiments, the generator will be configured to connect to a mechanical mover. The generator may be permanently attached to this mechanical mover or may be detachable. For example, the mechanical mover may be transported with the generator as a single unit. This mechanical mover may be an internal combustion engine, steam turbines, a diesel engine, gas turbine, or any other suitable mechanical mover or combination thereof. The mechanical mover may be powered by a fuel cell, energy storage system, nuclear reactor, or other suitable power source or combination thereof. In some embodiments, there may be two or more generators, of the same or different types.

The charging battery is used as an illustrative example of an energy storage system having multiple functions (i.e., starting and as-needed supplemental power supply) that may be coupled to a DC bus. In alternative embodiments, the battery may be a capacitor, electric double-layer capacitor, flywheel, battery, rechargeable battery, traction battery, or other suitable energy storage device or combinations thereof. The energy storage system may be configured to release energy, and also to recharge when supplied excess energy. The battery may be configured to accept excess charge from a DC bus, and may also be configured to accept charge by way of different circuits and external energy sources. The battery may be permanent or replaceable. It would be understood by one of ordinary skill in the art that the illustrative batteries and/or other energy storage system components may include additional elements, such as additional capacitors, batteries, fuses, or any other suitable component or combination thereof. The starting battery may be a lead-acid battery, nickel-metal-hydride battery, a lithium ion battery, a lithium polymer battery, or a bipolar battery. Furthermore, while for illustrative purposes, a single charging battery is shown, it would be understood by one of ordinary skill in the art that multiple batteries and/or other energy storage systems may be used.

In certain implementations, regulating and delivering of power may include determining that a state of charge of the battery or other energy storage system is less than a minimum threshold power level and, in response, the system may fail to provide additional power and/or may even reduce power output further or decouple various loads from the output power bus, including a decision to redirect output power back to the battery or other energy storage system in an effort to raise the state of charge above the minimum threshold power level. The purpose of this minimum threshold power level may be to ensure that the state of charge of the battery or energy storage system is maintained above a certain level to allow for subsequent starting of the generator at a future time, as well as acting as a safety measure to ensure the availability and/or longevity of the energy storage system.

The power delivery systems disclosed herein desirably utilize a power controller and/or other system components to regulate the amount of power supplied from the battery or other energy storage system to the power delivery system to optimize performance of the generator system. By including the disclosed devices, supplemental power may be drawn from the battery or energy storage system on an as needed basis. Furthermore, because the state of charge of the energy storage system may selectively be maintained at a high level (or may be supplemented quite simply by the inclusion of additional batteries, if desired), the system may be less likely to unnecessarily burn fuel to charge the energy storage system above a desired charge state. Therefore, the disclosed power delivery systems benefit from relatively lower inefficiencies and energy losses, which leads to longer energy storage system lifespan, less fuel consumption and a host of other advantages. Moreover, the employment of a low cost low voltage buck boost module and related components described herein can provide: (1) power buffering for generator block load acceptance, (2) shaving of peak power spikes, (3) provision of low voltage battery back up power when necessary, and/or (4) provision of voltage/current stability within regulated code requirements (or where there is a narrow band of acceptable power requirements for a given load or combination of loads).

In various embodiment, method(s) for manufacturing the disclosed devices and/or incorporating such devices into an electrical generating system are contemplated and are part of the scope of the present application.

The power delivery systems and components described herein may be used as a power delivery system in cars, trucks, automobiles, buses, trains, locomotives, boats, submarines, planes, jets, helicopters, and other transportation systems. In some embodiments, the power delivery systems may be used in a truck, where the generator may be coupled to an internal combustion engine and variable frequency drive outputs can be coupled to a traction motor. Such systems could allow for significantly less fuel usage as compared to those systems that do not incorporate an energy storage system such as a starting battery. The disclosed power delivery systems and components described herein may be used in coal or gas fired power plants, with back-up generators, in camping generators, as components for electrical device operation, or in other applications that require electrical power.

Variations and modifications will occur to those of skill in the art after reviewing this disclosure. The disclosed features may be implemented, in any combination and subcombinations (including multiple dependent combinations and subcombinations), with one or more other features described herein. The various features described or illustrated above, including any components thereof, may be combined or integrated in other systems. Moreover, certain features may be omitted or not implemented.

Equivalents

The invention may be embodied in other specific forms without departing from the spirit or essential characteristics thereof. The foregoing embodiments are therefore to be considered in all respects illustrative rather than limiting on the invention described herein. Scope of the invention is thus intended to include all changes that come within the meaning and range of equivalency of the descriptions provided herein.

General

Many of the aspects and advantages of the present invention may be more clearly understood and appreciated by reference to the accompanying drawings. The accompanying drawings are incorporated herein and form a part of the specification, illustrating embodiments of the present invention and together with the description, disclose the principles of the invention.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the disclosure herein.

The various headings and titles used herein are for the convenience of the reader, and should not be construed to limit or constrain any of the features or disclosures thereunder to a specific embodiment or embodiments. It should be understood that various exemplary embodiments could incorporate numerous combinations of the various advantages and/or features described, all manner of combinations of which are contemplated and expressly incorporated hereunder.

The use of the terms "a" and "an" and "the" and similar referents in the context of describing the invention are to be construed to cover both the singular and the plural, unless otherwise indicated herein or clearly contradicted by context. The terms "having," "including," and "containing" are to be construed as open-ended terms (i.e., meaning "including, but not limited to,") unless otherwise expressly specified herein. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., i.e., "such as") provided herein, is intended merely to better illuminate the invention and does not pose a limitation on the scope of the invention unless otherwise claimed. No language in the specification should be construed as indicating any non-claimed element as essential to the practice of the invention.

Devices that are in communication with each other need not be in continuous communication with each other, unless expressly specified otherwise. In addition, devices that are in communication with each other may communicate directly or indirectly through one or more intermediaries.

Although process steps, method steps, or the like, may be described in a sequential order, such processes and methods may be configured to work in alternate orders. In other words, any sequence or order of steps that may be described does not necessarily indicate a requirement that the steps be performed in that order. The steps of the processes or methods described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications or modifications of the disclosure.

What is claimed:

1. A supplemental power system for an electrical generating system of a mobile vehicle incorporating an internal combustion engine (ICE), an electric power generator (EPG) mechanically connected to the ICE, a rectified output from the EPG coupled to a high voltage DC bus and an inverter having a DC input coupled to the high voltage DC bus and an alternating current (AC) output coupled to an AC bus, the internal combustion engine having a starting battery power source which provides power to a starting motor of the ICE through a low voltage DC bus, the electrical generating system configured to accommodate a maximum step load change, the supplemental power system comprising:
    a DC boosting circuit including a boost converter connected between the low voltage DC bus and the high voltage DC bus, and
    a controller in sensory communication with the high voltage DC bus and the low voltage DC bus, the controller selectively allowing an increased DC current flow from the low voltage DC bus through the DC boosting circuit to the high voltage DC bus in response to a step load that is applied to the electrical generating system, the increased DC current flow providing a supplemental power that is less than the step load with the electric power generator supplying a remainder of the step load while maintaining operation of the electrical generating system.

2. The supplemental power system of claim 1, wherein the step load applied to the electrical generating system is greater than the maximum step load change.

3. The supplemental power system of claim 1, wherein the increased DC current flow is reduced over time.

4. The supplemental power system of claim 1, wherein the DC boosting circuit provides at least 1.5 kW of transient DC power to the high voltage DC bus for a period of at least 10 seconds.

5. The supplemental power system of claim 4, wherein the supplemental power provided by the DC boosting circuit provides at least 3 kW of transient DC power to the high voltage DC bus for a period of at least 10 seconds.

6. The supplemental power system of claim 4, wherein the supplemental power provided by the DC boosting circuit provides at least 1.5 kW of transient DC power to the high voltage DC bus for a period of at least 20 seconds.

7. The supplemental power system of claim 5, wherein the supplemental power provided by the DC boosting circuit can provides at least 3 kW of transient DC power to the high voltage DC bus for a period of at least 20 seconds.

8. The supplemental power system of claim 1, wherein the DC boosting circuit and controller are mounted directly to the internal combustion engine.

9. The supplemental power system of claim 1, wherein the DC boosting circuit and controller are fully contained within a starting battery compartment.

10. The supplemental power system of claim 1, wherein the controller can increase the DC current flow from the low voltage DC bus through the DC boosting circuit to the high voltage DC bus on a user selectable emergency basis when the internal combustion engine is not operating.

11. The supplemental power system of claim 1, wherein the electrical power generator is a permanent magnet generator.

12. The supplemental power system of claim 1, wherein the electrical power generator is selected from the group consisting of a homopolar generator, a magnetohydrodynamic generator and an induction generator.

13. The supplemental power system of claim 1, wherein the starting battery is selected from the group consisting of a capacitor, an electric double-layer capacitor, a flywheel, a battery, a rechargeable battery and a traction battery.

14. The supplemental power system of claim 1, wherein the starting battery is selected from the group consisting of a lead-acid battery, a nickel-metal-hydride battery, a lithium ion battery, a lithium polymer battery and a bipolar battery.

15. The supplemental power system of claim 1, wherein the electrical power generator, the starting battery, the low voltage DC bus, the DC boosting circuit, the inverter and the controller are fully contained within the mobile vehicle selected from the group consisting of a car, a truck, an automobile, a bus, a train, a locomotive, a boat, a submarine, a plane, a jet and a helicopter.

16. The supplemental power system of claim 1, wherein the controller provides the increased DC current flow for at least 1 second after the step load is applied to the electrical generating system.

17. The supplemental power system of claim 1, wherein the controller provides the increased DC current flow for at least 10 seconds after the step load is applied to the electrical generating system.

18. The supplemental power system of claim 1, wherein the step load applied to the electrical generating system is at least a 30% increase in a total load applied to the electrical generating system.

19. The supplemental power system of claim 1, wherein the step load applied to the electrical generating system is at least a 40% increase in a total load applied to the electrical generating system.

* * * * *